(12) United States Patent
Ujita

(10) Patent No.: US 10,192,657 B2
(45) Date of Patent: Jan. 29, 2019

(54) GROMMET AND WIRE HARNESS

(71) Applicant: Sumitomo Wiring Systems, Ltd., Yokkaichi, Mie (JP)

(72) Inventor: Satoshi Ujita, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/563,869

(22) PCT Filed: Apr. 5, 2016

(86) PCT No.: PCT/JP2016/061128
§ 371 (c)(1),
(2) Date: Oct. 2, 2017

(87) PCT Pub. No.: WO2016/163358
PCT Pub. Date: Oct. 13, 2016

(65) Prior Publication Data
US 2018/0261360 A1    Sep. 13, 2018

(30) Foreign Application Priority Data

Apr. 7, 2015    (JP) .................. 2015-078566

(51) Int. Cl.
*H01B 17/58* (2006.01)
*H02G 3/22* (2006.01)
(Continued)

(52) U.S. Cl.
CPC ....... *H01B 17/583* (2013.01); *B60R 16/0207* (2013.01); *B60R 16/0222* (2013.01); *H01B 7/0045* (2013.01); *H02G 3/22* (2013.01)

(58) Field of Classification Search
None
See application file for complete search history.

(56) References Cited

U.S. PATENT DOCUMENTS

2010/0181097 A1*  7/2010  Nagayasu .......... B60R 16/0222
                                                        174/152 G
2011/0061897 A1*  3/2011  Okuhara ............ B60R 16/0222
                                                        174/153 G
(Continued)

FOREIGN PATENT DOCUMENTS

JP    2009296739 A    12/2009
JP    2011217552 A    10/2011
JP    2012100396 A    5/2012

OTHER PUBLICATIONS

International Search Report for Application No. PCT/JP2016/061128 dated May 31, 2016; 4 pages.

*Primary Examiner* — Dimary S Lopez Cruz
(74) *Attorney, Agent, or Firm* — Reising Ethington, P.C.

(57) ABSTRACT

A grommet includes: a first cylindrical portion into which a group of electrical wires is to be inserted; a second cylindrical portion that is shorter than and surrounds the first cylindrical portion; a seat portion that is constituted by a rubber elastic body that surrounds the second cylindrical portion, and is capable of being fitted to a panel opening portion (Pe); and an annular connection portion that elastically connects the first cylindrical portion and the seat portion. The seat portion has an approximately elliptical shape. The connection portion has an inclined annular wall portion that supports the second cylindrical portion. Multiple rib portions are integrally provided on the inclined annular wall portion and the second cylindrical portion.

9 Claims, 14 Drawing Sheets

(51) Int. Cl.
    *B60R 16/02*    (2006.01)
    *H01B 7/00*    (2006.01)

(56) References Cited

U.S. PATENT DOCUMENTS

| | | | |
|---|---|---|---|
| 2011/0203833 A1* | 8/2011 | Miyakoshi | H02G 3/22 174/153 G |
| 2011/0265286 A1* | 11/2011 | Paku | B60R 16/0222 16/2.2 |
| 2013/0008693 A1 | 1/2013 | Okuhara | |
| 2015/0129303 A1* | 5/2015 | Shitamichi | B60R 16/0222 174/72 A |

* cited by examiner

GROMMET AND WIRE HARNESS

CROSS REFERENCE TO RELATED APPLICATIONS

This application claims the priority of Japanese patent application JP2015-078566 filed on Apr. 7, 2015, the entire contents of which are incorporated herein.

TECHNICAL FIELD

The present invention relates to a grommet and a wire harness.

BACKGROUND ART

Conventionally, a group of electrical wires is inserted into and held in a grommet formed by a rubber elastic body made of rubber, an elastomer, or the like, and then the grommet is fitted into a through-hole formed in a vehicle body panel that partitions the engine room and the compartment of an automobile, thus routing the group of electrical wires while also ensuring waterproofing between the engine room and the vehicle compartment (e.g., see Patent Document 1 JP2012-100396A).

A grommet 101 shown in FIG. 14 has the same configuration as that described in Patent Document 1. A wire harness 108 is constituted by a grommet 101, which is indicated by solid lines and is closely fitted into a circular through-hole H1 formed in a vehicle body panel P that is a partition wall between an engine room X and a compartment Y, and a group of electrical wires 102, which is indicated by dashed double-dotted lines and is inserted through and fixed to the grommet 101. The grommet 101 includes: a first cylindrical portion 103 that has a cylindrical shape; a second cylindrical portion 104 that has a cylindrical shape and coaxially surrounds an axially intermediate portion of the first cylindrical portion 103; a seat portion 105 that coaxially surrounds the first cylindrical portion 103 and the second cylindrical portion 104 and is to be mounted to the through-hole H1 of the vehicle body panel P; a first wall portion 106 that extends in the circumferential direction, is integrally continuous with the outer peripheral surface of the axially intermediate portion of the first cylindrical portion 103 and the inner peripheral surface of an axially intermediate portion of the seat portion 105, and has a mountain-shaped bent portion 106a in which the cross-sectional shape along the axis is bent in a mountain shape toward the compartment Y side; and a flare-shaped second wall portion 107 having a large-diameter end on the compartment Y side that is integrally continuous with a portion of the first wall portion 106 that is radially outward of the mountain-shaped bent portion 106a, and having a small-diameter end on the engine room X side that is integrally continuous with an end portion on the compartment Y side of the second cylindrical portion 104.

The edge portion (on the inner circumferential side) of the opening of the through-hole H1 of the vehicle body panel P is formed as a short conical cylinder-shaped flange that is bent toward the engine room X side. The seat portion 105 has an annular groove portion 105a that has a conical cylindrical surface that corresponds to the flange of the through-hole H1, and the flange of the through-hole H1 of the vehicle body panel P is fitted into the outer peripheral portion.

The portion of the group of electrical wires 102 that projects from the first cylindrical portion 103 toward the engine room X side, and the end portions, on the engine room X side, of the first cylindrical portion 103 and the second cylindrical portion 104 are integrally fixed to each other by a tape-wrap fixing portion T in which adhesive tape is wrapped.

With the wire harness 108, when the grommet 101 is arranged on the compartment Y side of the vehicle body panel such that the second cylindrical portion 104 faces the engine room X side, and then the group of electrical wires 102 is inserted into the through-hole H1 of the vehicle body panel P and pulled to the engine room X side, the first cylindrical portion 103 and the second cylindrical portion 104 pass through the through-hole H1, and the outer peripheral portion of the seat portion 105 is caught on the inner peripheral edge portion of the through-hole H1 of the panel P.

With the wire harness 108, when the group of electrical wires 102 is pulled more strongly to the engine room X side, the seat portion 105 deforms elastically, the flange of the through-hole H1 of the panel P becomes fitted into the annular groove portion 105a of the seat portion 105, and the grommet 101 becomes fixed to the vehicle body panel P.

SUMMARY

Incidentally, in view of the structure of the vehicle, there are cases where it is preferable that the grommet mounting through-hole formed in the vehicle body panel is elliptical.

However, the above-described conventional grommet 101 is used in the case where the through-hole H of the vehicle body panel P is circular, and therefore could not be used in a case where the opening in the vehicle body panel is elliptical.

To address this, an improvement is conceivable in which, for example, modifications are made such that the seat portion is formed with an elliptical shape that corresponds to the elliptical opening portion in the vehicle body panel, and a pair of crescent-shaped wall portions are provided between the elliptical seat portion and the first wall portion 106 and second wall portion 107 that are circular similarly to the conventional example.

However, even if such an improvement is made, unresolved problems such as the following remain. Specifically, in the case of mounting a grommet having an elliptical seat portion as described above to an elliptical through-hole in a vehicle body panel, when the outer peripheral portion of the seat portion is caught on the inner peripheral edge portion of the vehicle body panel, and then the group of electrical wires is strongly pulled into the engine room in order to mount the grommet to the vehicle body panel, for example, the grommet elastically deforms in a manner in which the portions that form flat surfaces (pair of crescent-shaped wall portions) between the elliptical seat portion and the first wall portion 106 and second wall portion 107 collapse or bend in the movement direction of the group of electrical wires from the initial orientation of intersecting the axis of the first cylindrical portion 103.

For this reason, a longer pulling stroke needs to be applied to the group of electrical wires in order for the seat portion of the grommet to be fitted to the inner peripheral edge portion of the opening in the vehicle body panel on the two end sides in the major axis direction of the elliptical shape, and a problem can occur in that the grommet cannot be efficiently mounted to the vehicle body panel.

The present design was achieved in order to solve the foregoing problems, and an object thereof is to provide a grommet and a wire harness according to which the grommet can be efficiently mounted to an elliptical through-hole formed in a vehicle body panel.

In order to achieve the above object, a grommet according to the present design is a grommet that is to be attached to a group of electrical wires and mounted to a vehicle body panel so as to block an opening in the vehicle body panel, the grommet including: a first cylindrical portion through which the group of electrical wires is inserted; a second cylindrical portion that is formed shorter than the first cylindrical portion and surrounds the first cylindrical portion; a seat portion that is constituted by an annular rubber elastic body that surrounds the second cylindrical portion and is capable of constriction in diameter, the seat portion having an annular unevenness portion capable of fitting around an edge portion of the opening in the vehicle body panel; and an annular connection portion that elastically connects the first cylindrical portion and the seat portion, wherein the seat portion has an approximately elliptical shape, the connection portion has an inclined annular wall portion that forms an inclined annular surface (truncated cone surface-shaped surface) that is inclined in an axial direction of the first cylindrical portion between the first cylindrical portion and the seat portion, the inclined annular wall portion supporting a base end portion of the second cylindrical portion, and a plurality of rib portions are integrally provided on the inclined annular wall portion and the second cylindrical portion, the plurality of rib portions extending from an axially intermediate portion of the second cylindrical portion to the inclined annular wall portion on two sides in a major axis direction of the approximately elliptical shape, and projecting from the second cylindrical portion to a seat portion side.

According to this configuration, with the grommet according to the present design, the inclined annular wall portion, which connects the first cylindrical portion and the seat portion and supports the base end portion of the second cylindrical portion, is reinforced by the rib portions that extend from the axially intermediate portion of the second cylindrical portion to the inclined annular wall portion on the two sides in the major axis direction of the seat portion and project from the second cylindrical portion toward the seat portion. Accordingly, even if the group of electrical wires of the wire harness with the grommet attached thereto is strongly pulled in order to fit the grommet into the opening portion of the vehicle body panel, it is possible to effectively suppress the case where the inclined annular wall portion collapses or undergoes bending deformation on the two end sides in the major axis direction of the seat portion, and the pulling stroke of the group of electrical wires that is necessary to fit the seat portion to the vehicle body panel is reduced compared to conventional technology. As a result, the grommet can be efficiently mounted to the vehicle body panel.

In the grommet of the present design, a configuration is possible in which the connection portion has an inner truncated cone surface-shaped wall portion between the inclined annular wall portion and the first cylindrical portion, the inner truncated cone surface-shaped wall portion being inclined in a direction opposite in the axial direction to the annular inclined surface of the inclined annular wall portion.

Also, a configuration is possible in which an outer truncated cone surface-shaped wall portion is integrally provided between the base end portion of the second cylindrical portion and the inclined annular wall portion of the connection portion, the outer truncated cone surface-shaped wall portion being inclined in a direction opposite in the axial direction to the annular inclined surface of the inclined annular wall portion.

Furthermore, it is preferable that the plurality of rib portions extend from an axially intermediate portion of the second cylindrical portion to a connection portion between the inclined annular wall portion and the seat portion, and a height of projection of the rib portions from the second cylindrical portion may be smaller on one end side located on an axially intermediate portion side of the second cylindrical portion, and may be larger on another end side that is connected to the inclined annular wall portion.

Alternatively, in order to achieve the above-described object, a grommet according to the present design is a grommet that has a first cylindrical portion into which a group of electrical wires is to be inserted, and that is to be mounted to an elliptical through-hole formed in a vehicle body panel that is a partition wall between an engine room and a compartment, the grommet including: a second cylindrical portion that is shaped as a cylinder that has a predetermined diameter larger than the first cylindrical portion and a predetermined length shorter than the first cylindrical portion, and is located at a position coaxially surrounding an axially intermediate portion of the first cylindrical portion; a seat portion that is shaped as an elliptical cylinder having a predetermined size larger than the second cylindrical portion, is located at a position coaxially surrounding the first cylindrical portion and being biased on a compartment side relative to the second cylindrical portion, and is to be mounted to the through-hole of the vehicle body panel at a step portion formed on the compartment side; a compartment-side annular connection portion having a large-diameter end portion that is integrally continuous with an inner peripheral surface of the seat portion and a small-diameter end portion that is integrally continuous with an outer peripheral surface of the first cylindrical portion; and an engine room-side annular connection portion having a large-diameter end portion that is integrally continuous with an intermediate portion of the compartment-side annular connection portion, the intermediate portion being biased toward the large-diameter end portion of the compartment-side annular connection portion, and a small-diameter end portion that is integrally continuous with a compartment-side end portion of the second cylindrical portion, wherein the seat portion has an elliptical shape in plan view, and an outer peripheral portion is provided with an annular groove portion into which an opening edge portion of the through-hole is to be fitted, and the engine room-side annular connection portion has a plurality of rib portions on an engine room side, the plurality of rib portions extending in a manner of radiating in a longitudinal direction of the seat portion from the small-diameter end portion to the large-diameter end portion, and the plurality of rib portions being integrally continuous with an inner peripheral surface of the seat portion.

According to this configuration, with the grommet according to the present design, when the group of electrical wires is inserted into and fixed to the first cylindrical portion, the grommet is arranged on the compartment side of the vehicle body panel such that the second cylindrical portion faces the engine room X side, and then the group of electrical wires is inserted into the through-hole of the vehicle body panel and pulled to the engine room side, the first cylindrical portion and the second cylindrical portion pass through the through-hole, and the outer peripheral portion of the seat portion is caught on the inner peripheral edge portion of the through-hole of the panel.

With the grommet according to the present design, when the group of electrical wires is pulled more strongly to the engine room side, the seat portion deforms elastically, the inner peripheral edge portion of the through-hole of the panel becomes fitted into the annular groove portion of the seat portion, and the grommet becomes fixed to the vehicle body panel.

With the grommet according to the present design, the engine room-side annular connection portion has, on the engine room side, the rib portions that extend in a manner of radiating in the longitudinal direction of the seat portion from the small-diameter end portion to the large-diameter end portion and that are integrally continuous with the inner peripheral surface of the seat portion, and therefore when the group of electrical wires is pulled on the engine room side, and the grommet is fitted into the through-hole of the vehicle body panel, stretching of the engine room-side annular connection portion is suppressed, and the pulling force applied to the group of electrical wires is effectively transmitted to the seat portion of the grommet.

For this reason, with the grommet according to the present design, the pulling stroke of the group of electrical wires that is necessary to fit the inner peripheral edge portion of the through-hole of the panel into the annular groove portion of the seat portion is reduced compared to conventional technology, and the grommet can be efficiently mounted to the vehicle body panel.

In the grommet according to the present design, it is preferable that the compartment-side annular connection portion has a truncated cone-shaped cylindrical portion that is positioned in correspondence with the step portion of the seat portion, and has a small-diameter end portion that is integrally continuous with an outer peripheral surface of an axially intermediate portion of the first cylindrical portion and a large-diameter end portion that extends toward the compartment, and a first pseudo truncated cone-shaped cylindrical portion that is located between the truncated cone-shaped cylindrical portion and the seat portion, and has a small-diameter end portion that is integrally continuous with the large-diameter end portion of the truncated cone-shaped cylindrical portion and a large-diameter end portion that is integrally continuous with an intermediate portion of an inner peripheral surface of the seat portion, and the engine room-side annular connection portion has a second pseudo truncated cone-shaped cylindrical portion that is located between the first pseudo truncated cone-shaped cylindrical portion and the second cylindrical portion and has a large-diameter end portion that is integrally continuous with an intermediate portion of the first pseudo truncated cone-shaped cylindrical portion, the intermediate portion being biased toward the large-diameter end portion of the first pseudo truncated cone-shaped cylindrical portion, and a small-diameter end portion that is integrally continuous with a compartment-side end portion of the second cylindrical portion.

With the grommet according to the present design, the first cylindrical portion and the seat portion are integrally connected via the truncated cone-shaped cylindrical portion and the first pseudo truncated cone-shaped cylindrical portion, and the second cylindrical portion and the first pseudo truncated cone-shaped cylindrical portion are integrally connected via the second pseudo truncated cone-shaped cylindrical portion. Also, the connection between the first pseudo truncated cone-shaped cylindrical portion and the second pseudo truncated cone-shaped cylindrical portion is at a position biased toward the seat portion. Moreover, the first pseudo truncated cone-shaped cylindrical portion and the second pseudo truncated cone-shaped cylindrical portion do not have a conventional flat surface that is parallel with a plane perpendicular to the axis of the first cylindrical portion. Furthermore, the second pseudo truncated cone-shaped cylindrical portion has the rib portions that extend in a manner of radiating in the longitudinal direction of the seat portion from the small-diameter end portion toward the large-diameter end portion. Accordingly, when the group of electrical wires is pulled on the engine room side, and the grommet is fitted into the through-hole of the vehicle body panel, stretching of the first pseudo truncated cone-shaped cylindrical portion and the second pseudo truncated cone-shaped cylindrical portion is suppressed, and the pulling force applied to the group of electrical wires is effectively transmitted to the seat portion of the grommet.

For this reason, with the grommet according to the present design, the pulling stroke of the group of electrical wires that is necessary to fit the inner peripheral edge portion of the through-hole of the panel into the annular groove portion of the seat portion is reduced compared to conventional technology, and the grommet can be efficiently mounted to the vehicle body panel.

In the grommet according to the present design, it is preferable that the first pseudo truncated cone-shaped cylindrical portion has an integral shape in which a pair of first semicircular truncated cylinder portion are in portions on two sides, and a pair of first inclined surface portions are integrally continuous with and located between the pair of first semicircular truncated cylinder portions, and the second pseudo truncated cone-shaped cylindrical portion has an integral shape in which a pair of second semicircular truncated cylinder portion are in portions on two sides, and a pair of second inclined surface portions are integrally continuous with and located between the pair of second semicircular truncated cylinder portions.

According to this configuration, the first pseudo truncated cone-shaped cylindrical portion and the second pseudo truncated cone-shaped cylindrical portion are geometrically shaped, and dies for them can be easily designed and manufactured.

In the grommet according to the present design, it is preferable that a connection portion between the second cylindrical portion and the second pseudo truncated cone-shaped cylindrical portion is located at a position inward of and corresponding to an end portion on the engine room side of the seat portion.

According to this configuration, the tape-wrap fixing portion is arranged closer to the seat portion, thus reducing the stroke for mounting the grommet to the through-hole of the vehicle body panel.

In order to achieve the above-described object, a wire harness according to the present design includes: a grommet having any of the above-described configurations; the group of electrical wires inserted into the first cylindrical portion of the grommet; and an annular fixing member that fixes a leading end portion of the second cylindrical portion of the grommet, which is located on one end side of the first cylindrical portion, around the first cylindrical portion, and fixes a portion on the one end side of the first cylindrical portion to the group of electrical wires.

According to this configuration, with the wire harness according to the present design, even if the group of electrical wires of the wire harness is strongly pulled in order to fit the grommet into the opening portion of the vehicle body panel, it is possible to effectively suppress the case where the inclined annular wall portion collapses or undergoes bending deformation on the two end sides in the major axis direction of the seat portion, and the grommet can be efficiently mounted to the vehicle body panel.

The annular fixing member may be formed by wrapping adhesive tape around the first cylindrical portion, the second cylindrical portion, and the group of electrical wires.

With the wire harness according to the present design, when the grommet is fitted into the through-hole of the vehicle body panel, stretching of the first pseudo truncated cone-shaped cylindrical portion and the second pseudo truncated cone-shaped cylindrical portion is suppressed, and the pulling force applied to the group of electrical wires is effectively transmitted to the seat portion of the grommet.

For this reason, with the wire harness according to the present design, the pulling stroke of the group of electrical wires that is necessary to fit the seat portion to the opening portion of the vehicle body panel is reduced compared to conventional technology, and the grommet can be efficiently mounted to the vehicle body panel.

According to the present design, it is possible to provide a grommet and a wire harness according to which the grommet can be efficiently mounted to an elliptical through-hole formed in a vehicle body panel.

DESCRIPTION OF EMBODIMENTS

Hereinafter, wire harnesses according to embodiments of the present design will be described with reference to the drawings.

First Embodiment

As shown in FIGS. 1 to 4, a wire harness 1 according to the present embodiment has a grommet 12, which is for mounting to an elliptical through-hole H2 (opening) formed in a vehicle body panel P that is a partition wall between an engine room X and a compartment Y, a group of electrical wires 11 that is inserted into the grommet 12, and a tape-wrap fixing portion 13 that fixes the group of electrical wires 11 to the grommet 12.

Figure 1:
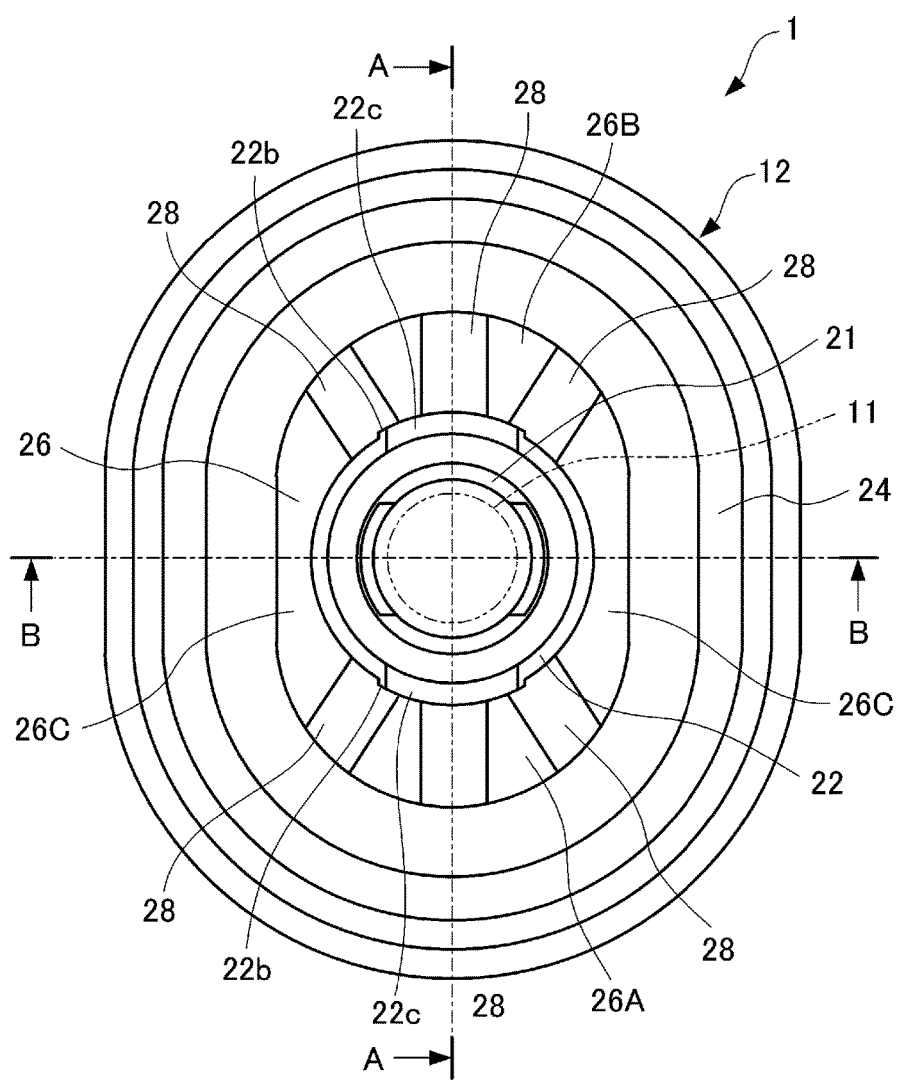
FIG. 1 is an axial direction view of a wire harness according to a first embodiment.
Figure 2:
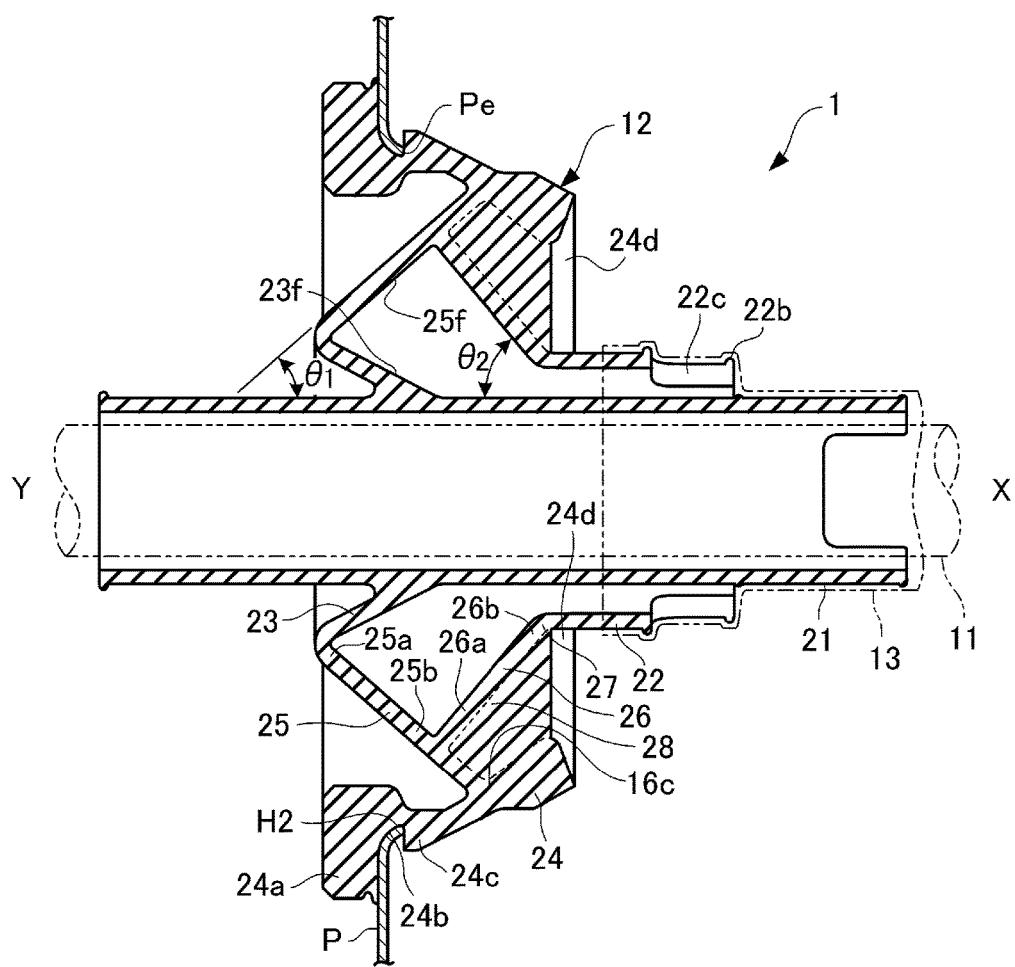
FIG. 2 is a cross-sectional view taken along A-A in FIG. 1.
Figure 3:
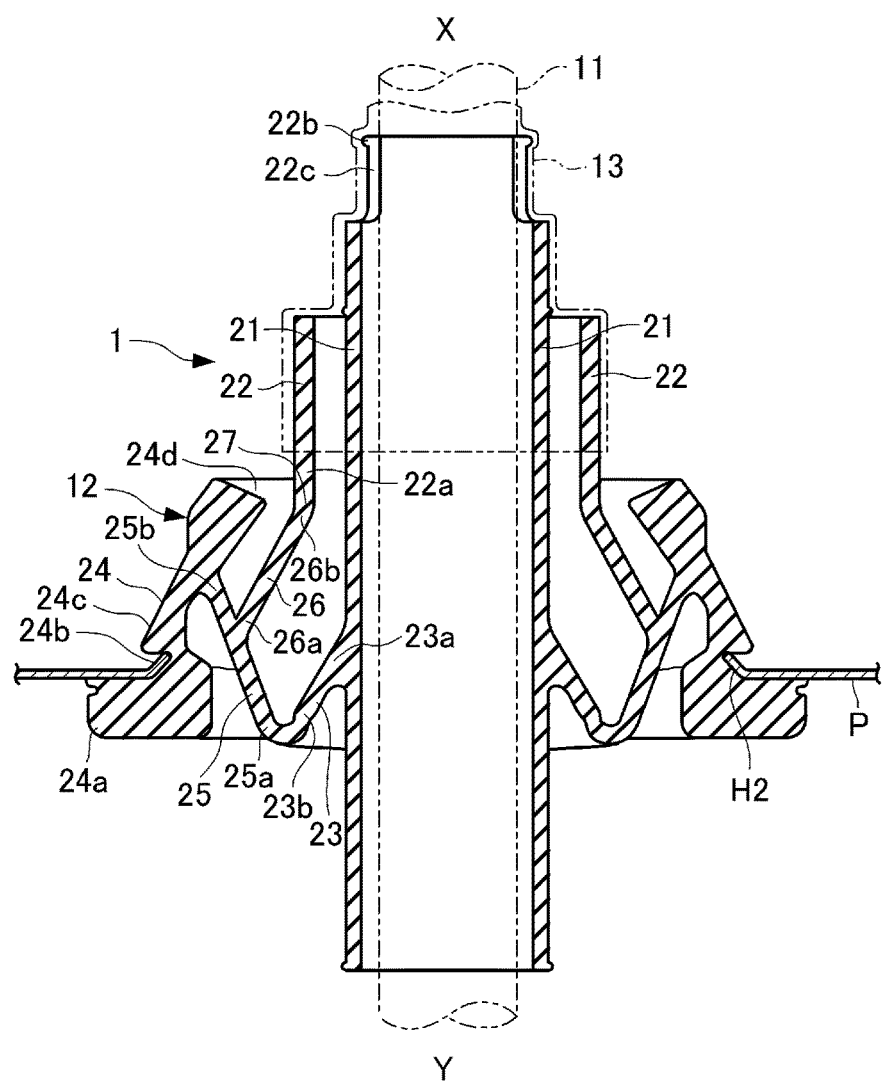
FIG. 3 is a cross-sectional view taken along B-B in FIG. 1.
Figure 4:
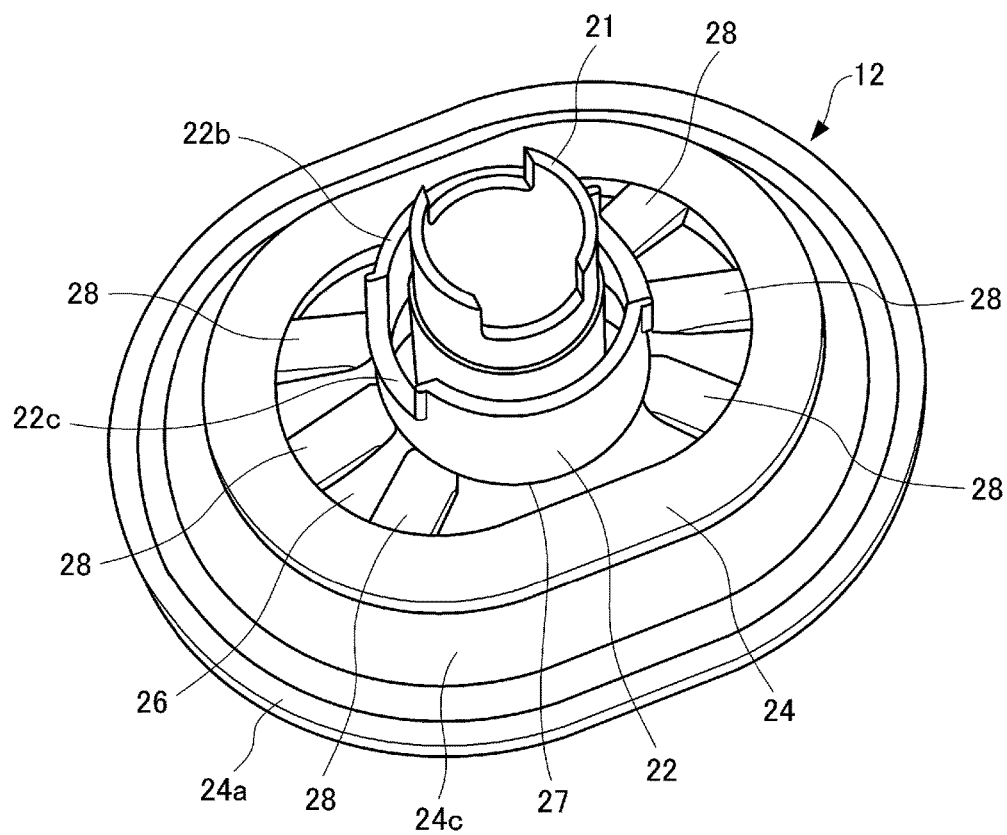
FIG. 4 is a perspective view of a grommet for application to the wire harness according to the first embodiment.

As shown in FIGS. 2 and 3, the grommet 12 is a rubber molded body (rubber elastic body) that has excellent flexibility and a high tensile strength, has excellent weather resistance and durability, and has a first cylindrical portion 21, a second cylindrical portion 22, a seat portion 24, a truncated cone-shaped cylindrical portion 23, a first pseudo truncated cone-shaped cylindrical portion 25, and a second pseudo truncated cone-shaped cylindrical portion 26. The truncated cone-shaped cylindrical portion 23 and the first pseudo truncated cone-shaped cylindrical portion 25 correspond to an annular connection portion or a compartment-side annular connection portion. Also, the second pseudo truncated cone-shaped cylindrical portion 26 corresponds to a base-side portion of the second cylindrical portion or an engine room-side annular connection portion.

The first cylindrical portion 21 is shaped as a cylinder that has a predetermined length extending on both sides of the vehicle body panel P, and has a predetermined inner diameter necessary for close-fitting insertion of the group of electrical wires 11 for example. The first cylindrical portion 21 has a length of 20 cm for example, a central region thereof in the axial direction is located at a position for passing through the through-hole H2, and respective ends extend in the engine room X and the compartment Y.

The second cylindrical portion 22 is shaped as a cylinder that has a predetermined diameter larger than the first cylindrical portion 21 and a predetermined length shorter than the same, and is located at a position coaxially surrounding the axially intermediate portion of the first cylindrical portion 21.

The seat portion 24 has an elliptical shape in plan view, and a step portion 24a that is somewhat larger than the contour of the elliptical through-hole in the vehicle body panel P is provided on an end portion on the compartment Y side, and an annular groove portion 24b (annular unevenness portion) into which an inner peripheral edge portion Pe (edge portion that forms the opening) of the through-hole H2 of the vehicle body panel P fits is provided in the step portion 24a.

The seat portion 24 has an intermediate outer diameter portion 24c (annular unevenness portion), a portion of which that is adjacent to the step portion 24a across the annular groove portion 24b being capable of being forcibly constricted and pushed through the inner peripheral edge portion Pe of the through-hole H2, and that undergoes elastic restoration after being pushed through so as to come into close contact with the vehicle body panel P. The outer diameter of the portion on the engine room X side gradually decreases away from the intermediate outer diameter portion 24c, and the end portion is slightly smaller than the through-hole H2 of the vehicle body panel P.

The seat portion 24 is shaped as an elliptical cylinder whose inner diameter is larger than the second cylindrical portion 22, and is arranged so as to coaxially surround the first cylindrical portion 21 at a location biased toward the compartment Y side relative to the second cylindrical portion 22. Also, the seat portion 24 is mounted in a state where the step portion 24a formed on the compartment Y side is fitted to the inner peripheral edge portion Pe of the through-hole H2 of the vehicle body panel P so as to ensure waterproofing.

When the grommet 12 is arranged such that the second cylindrical portion 22 on the compartment Y side of the vehicle body panel P faces the engine room X side, and then the group of electrical wires 11 is inserted through the through-hole H2 of the vehicle body panel P and pulled on the engine room X side, the first cylindrical portion 21 and the second cylindrical portion 22 pass through the through-hole H2, and the step portion 24a of the seat portion 24 is caught on the inner peripheral edge portion Pe of the through-hole H2 of the vehicle body panel P.

The truncated cone-shaped cylindrical portion 23 is integrally connected to the first cylindrical portion 21 at a position in the axial direction that corresponds to the step portion 24a of the seat portion 24, and as shown in FIG. 2, has a wall surface that is a truncated cone surface (truncated cone side face) inclined such that the generatrix forms a predetermined inclination angle θ1 with the outer peripheral surface and axis of the first cylindrical portion 21 so as to increase in diameter while extending to the left side (compartment side) in the figure. Also, the truncated cone-shaped cylindrical portion 23 is coaxially connected to the first cylindrical portion 21 between the seat portion 24 and the first cylindrical portion 21, has a small-diameter end portion 23a that is integrally continuous with the outer peripheral surface of the axially intermediate portion of the first cylindrical portion 21, and has a large-diameter end portion 23b that extends to the compartment Y side. The first cylindrical portion 21 may be arranged so as to axially intersect the seat portion 24.

Figure 5:
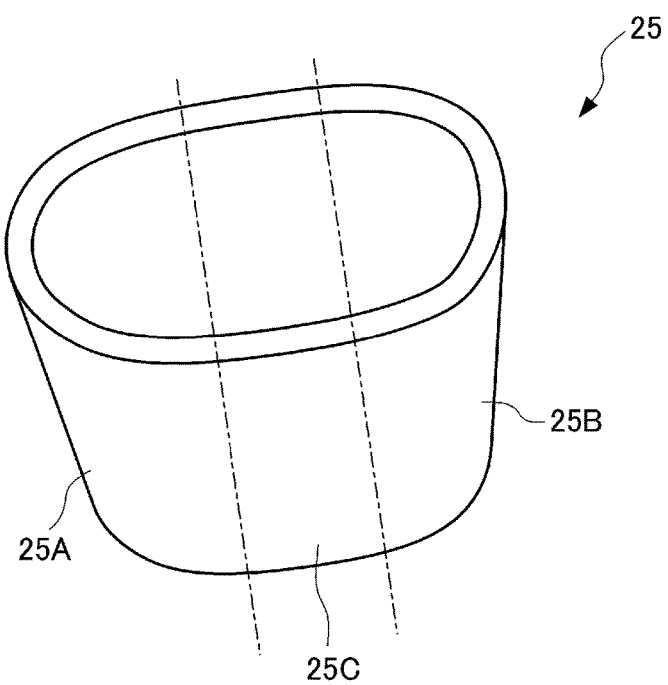
FIG. 5 is a diagram for describing a relevant portion of the wire harness of the first embodiment.

As shown in FIG. 5, the first pseudo truncated cone-shaped cylindrical portion 25 is located between the truncated cone-shaped cylindrical portion 23 and the seat portion 24, and has a shape according to which a small-diameter end portion 25a is integrally continuous with the large-diameter end portion 23b of the truncated cone-shaped cylindrical portion 23, and a large-diameter end portion 25b is integrally continuous with an intermediate portion of the inner peripheral surface of the seat portion 24.

The first pseudo truncated cone-shaped cylindrical portion 25 has a pair of first semicircular truncated cylinder portions 25A and 25B in end portions on the two sides, and has a pair of first inclined surface portions 25C that are integrally continuous with and located between the pair of first semicircular truncated cylinder portions 25A and 25B.

The second pseudo truncated cone-shaped cylindrical portion 26 is located between the first pseudo truncated cone-shaped cylindrical portion 25 and a cylindrical portion 22a of the second cylindrical portion 22, and has a large-diameter end portion 26a on one end side in the axial direction that is integrally connected to a portion of the large-diameter end portion 25b that is located in an intermediate portion of the first pseudo truncated cone-shaped cylindrical portion 25 biased toward the seat portion 24. Also, a small-diameter end portion 26b on the second pseudo truncated cone-shaped cylindrical portion 26 on the other end side in the axial direction is integrally connected in a continuous manner with an end portion of the cylindrical portion 22a of the second cylindrical portion 22. This second pseudo truncated cone-shaped cylindrical portion 26 is inclined such that the generatrix forms a predetermined inclination angle θ2 with the outer peripheral surface and axis of the first cylindrical portion 21.

An intermediate connection portion 27 between the cylindrical portion 22a of the second cylindrical portion 22 and the small-diameter end portion 26b of the second pseudo truncated cone-shaped cylindrical portion 26, which is the base end-side portion of the second cylindrical portion 22, is an axially intermediate portion that is arranged at a position in the axial direction that corresponds to an end portion 24d on the engine room X side of the seat portion 24.

The second pseudo truncated cone-shaped cylindrical portion 26 has multiple rib portions 28 that are on the surface on the engine room X side, extend in a manner of radiating in the longitudinal direction of the seat portion 24 from the small-diameter end portion 26b toward the large-diameter end portion 26a, and are continuous with the inner peripheral surface of the seat portion 24.

As shown in FIG. 2, the rib portions 28 are integrally connected to an inclined annular wall portion constituted by the first pseudo truncated cone-shaped cylindrical portion 25 and a base end-side portion of the second cylindrical portion 22 constituted by the small-diameter end portion 26b of the second pseudo truncated cone-shaped cylindrical portion 26, extend from an intermediate connection portion 27, which is an axially intermediate portion of the second cylindrical portion 22, toward the first pseudo truncated cone-shaped cylindrical portion 25 on the two sides in the major axis direction of the approximately elliptical seat portion 24, and also project from the second cylindrical portion 22 toward the seat portion 24.

Also, the truncated cone-shaped cylindrical portion 23 and the first pseudo truncated cone-shaped cylindrical portion 25 constitute a connection portion that connects the first cylindrical portion 21 and the seat portion 24, and the truncated cone-shaped cylindrical portion 23 located between the first pseudo truncated cone-shaped cylindrical portion 25 and the first cylindrical portion 21 serves as an inner truncated cone surface-shaped wall portion that is inclined in a direction opposite in the axial direction to an annular inclined surface 25f of the first pseudo truncated cone-shaped cylindrical portion 25. Accordingly, the truncated cone-shaped cylindrical portion 23 and the first pseudo truncated cone-shaped cylindrical portion 25 respectively form inclined annular surfaces 23f and 25f, and have a bent cross-sectional shape in which the wall surface is bent at the position where the two inclined annular surfaces 23f and 25f are connected.

Furthermore, between the second cylindrical portion 22 and the first pseudo truncated cone-shaped cylindrical portion 25, the second pseudo truncated cone-shaped cylindrical portion 26 serves as an outer truncated cone surface-shaped wall portion that is inclined in a direction opposite in the axial direction to the annular inclined surface 25f of the first pseudo truncated cone-shaped cylindrical portion 25, and is arranged coaxially with and inclined in the same direction as the truncated cone-shaped cylindrical portion 23.

Figure 6:
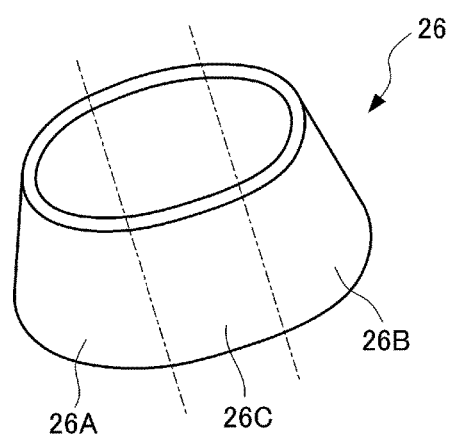
FIG. 6 is a diagram for describing another relevant portion of the wire harness of the first embodiment.

As shown in FIG. 6, the second pseudo truncated cone-shaped cylindrical portion 26 has an integral shape in which a pair of second semicircular truncated cylinder portions 26A and 26B are in portions on the two sides, and a pair of second inclined surface portions 26C are integrally continuous with and located between the pair of second semicircular truncated cylinder portions 26A and 26B.

The tape-wrap fixing portion 13 is a fixing portion in which adhesive tape is wrapped around the first cylindrical portion 21, the group of electrical wires 11, and the second cylindrical portion 22 to fix them together, and constitutes an annular fixing member of the present invention. In order to prevent detachment of the tape-wrap fixing portion 13, the second cylindrical portion 22 is provided with protrusions 22b and cutout portions 22c for locking the initial round of tape wrapping.

Next, actions of the present invention will be described.

In the wire harness 1 according to the present embodiment having the above configuration, the first pseudo truncated cone-shaped cylindrical portion 25, which connects the first cylindrical portion 21 and the seat portion 24 and supports the base end portion of the second cylindrical portion 22, is reinforced by the rib portions 28 that extend from the intermediate connection portion 27 of the second cylindrical portion 22 to the first pseudo truncated cone-shaped cylindrical portion 25 on the two sides in the major axis direction of the seat portion 24 and project from the second cylindrical portion 22 toward the seat portion 24. Accordingly, even if the group of electrical wires 11 of the wire harness 1 with the grommet 12 attached thereto is strongly pulled in order to fit the grommet 12 to the inner peripheral edge portion Pe of the through-hole H2 of the vehicle body panel P, it is possible to effectively suppress the case where the second pseudo truncated cone-shaped cylindrical portion 26 collapses or undergoes bending deformation on the two end sides in the major axis direction of the seat portion 24, and with respect to the pulling stroke of the group of electrical wires 11 that is necessary to fit the seat portion 24 to the vehicle body panel P (the movement stroke in the rightward direction in FIG. 2, which is the pulling direction), the pulling stroke on the two sides in the major axis direction is suppressed to approximately the same as on the two sides in the minor axis direction of the seat portion 24. As a result, the grommet 12 can be efficiently mounted to the vehicle body panel P.

More specifically, when the grommet 12 is arranged on the compartment Y side of the vehicle body panel P such that the second cylindrical portion 22 faces the engine room X side, and then the group of electrical wires 11 is inserted through the through-hole H2 of the vehicle body panel P and pulled on the engine room X side, the first cylindrical portion 21 and the second cylindrical portion 22 pass through the through-hole H2, and the intermediate outer diameter portion 24c in the vicinity of the step portion 24a of the seat portion 24 is caught on the inner peripheral edge portion Pe of the through-hole H2 of the vehicle body panel P.

With the wire harness 1, when the group of electrical wires 11 is then pulled more strongly to the engine room X side, the intermediate outer diameter portion 24c of the seat portion 24 deforms elastically in the diameter shrinking direction, the inner peripheral edge portion of the through-hole H2 of the vehicle body panel P becomes fitted into the annular groove portion 24b of the step portion 24a, and the grommet 12 becomes fixed to the vehicle body panel P.

With the grommet 12 and the wire harness 1 according to the present design, the first cylindrical portion 21 and the seat portion 24 are integrally connected via the truncated cone-shaped cylindrical portion 23 and the first pseudo truncated cone-shaped cylindrical portion 25, and the second cylindrical portion 22 and the first pseudo truncated cone-shaped cylindrical portion 25 are integrally connected via the second pseudo truncated cone-shaped cylindrical portion 26. The connection between the first pseudo truncated cone-shaped cylindrical portion 25 and the second pseudo truncated cone-shaped cylindrical portion 26 is at a position biased toward the seat portion 24. The first pseudo truncated cone-shaped cylindrical portion 25 and the second pseudo truncated cone-shaped cylindrical portion 26 do not have a conventional flat surface that is parallel with a plane perpendicular to the axis of the first cylindrical portion 21. The second pseudo truncated cone-shaped cylindrical portion 26 has the rib portions 28 that are on the surface on the engine room X side, extend in a manner of radiating in the longitudinal direction of the seat portion 24 from the small-diameter end portion 26b toward the large-diameter end portion 26a, and are continuous with the inner peripheral surface of the seat portion 24. Accordingly, when the group of electrical wires 11 is pulled on the engine room X side, and the grommet 12 is fitted into the through-hole H2 of the vehicle body panel P, stretching of the first pseudo truncated cone-shaped cylindrical portion 25 and the second pseudo truncated cone-shaped cylindrical portion 26 is suppressed, and the pulling force applied to the group of electrical wires 11 is effectively transmitted to the seat portion 24 of the grommet 12.

For this reason, with the grommet 12 and the wire harness 1 according to the present embodiment, compared with conventional examples, it is possible to reduce the pulling stroke of the group of electrical wires 11 needed in order to fit the inner peripheral edge portion Pe of the through-hole H2 of the vehicle body panel P into the annular groove portion 24b of the seat portion 24, and the grommet 12 can be efficiently mounted to the vehicle body panel P.

In the grommet 12 and the wire harness 1 according to the present embodiment, the first pseudo truncated cone-shaped cylindrical portion 25 has an integral shape in which the pair of first semicircular truncated cylinder portions 25A and 25B are in the two side portions, and the pair of first inclined surface portions 25C are integrally continuous with and located between the pair of first semicircular truncated cylinder portions 25A and 25B. Also, the second pseudo truncated cone-shaped cylindrical portion 26 has an integral shape in which the pair of second semicircular truncated cylinder portions 26A and 26B are in portions on the two sides, and the pair of second inclined surface portions 26C are integrally continuous with and located between the pair of second semicircular truncated cylinder portions 26A and 26B. Accordingly, the first pseudo truncated cone-shaped cylindrical portion 25 and the second pseudo truncated cone-shaped cylindrical portion 26 are geometrically shaped, and dies for them can be easily designed and manufactured.

In the grommet 12 and the wire harness 1 according to the present embodiment, the intermediate connection portion 27 between the second cylindrical portion 22 and the second pseudo truncated cone-shaped cylindrical portion 26 is located inward of the end portion of the seat portion 24 on the engine room X side, and the tape-wrap fixing portion 13 is arranged closer to the seat portion 24, thus reducing the stroke for mounting the grommet 12 to the through-hole H2 of the vehicle body panel P.

In this way, in the present embodiment, it is possible to provide the grommet 12 that can be efficiently mounted to the vehicle body panel P.

Note that in the embodiment described above, the rib portions 28 extend from the intermediate connection portion 27, which is an axially intermediate portion of the second cylindrical portion 22, toward the first pseudo truncated cone-shaped cylindrical portion 25 on the two sides in the major axis direction of the approximately elliptical seat portion 24, and also project from the second cylindrical portion 22 toward the seat portion 24, and are connected to the seat portion 24 over the entirety of the extending region. However, these rib portions are correction ribs for transmitting operation force applied in the grommet mounting direction from the second cylindrical portion 22 to the seat portion 24, and therefore there is no need for the rib portions 28 to be connected to the end portion 24d on the engine room X side of the seat portion 24, which is separated from the connection between the seat portion 24 and the first pseudo truncated cone-shaped cylindrical portion 25.

Other Embodiment

Figure 7:
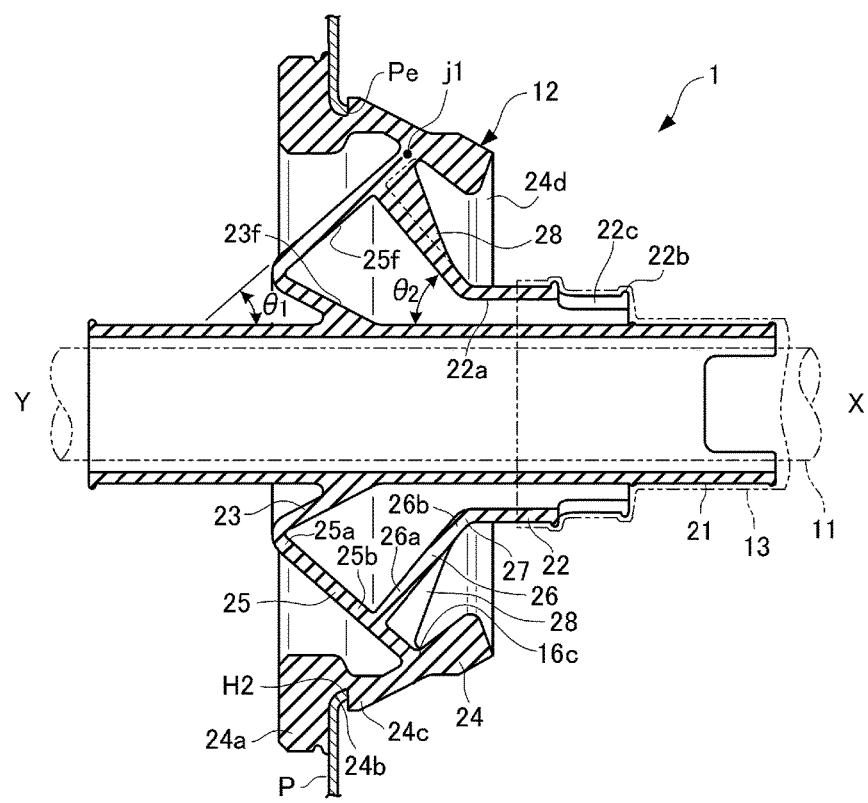
FIG. 7 is a transverse sectional view of a relevant portion of a wire harness according to another embodiment, and corresponds to FIG. 2, which is a cross-sectional view taken along A-A in FIG. 1.

In view of this, the grommet 12 may be configured according to another embodiment shown in FIG. 7.

Note that this embodiment is the same as the first embodiment with the exception of the projecting shape of the rib portions 28, and therefore the same reference signs as in the first embodiment will be used, and only differences from the first embodiment will be described.

As shown in FIG. 7, in the present embodiment, the rib portions 28 extend from the vicinity of the intermediate connection portion 27 (axial intermediate portion) of the second cylindrical portion 22 to a connection portion j1 between the first pseudo truncated cone-shaped cylindrical portion 25 and the seat portion 24, and the height of projection of the rib portions 28 from the second cylindrical portion 22 is smaller on one end side of the second cylindrical portion 22 located on the intermediate connection portion 27 side, and is larger on the other end side that is connected to the first pseudo truncated cone-shaped cylindrical portion 25.

Of course, in this case as well, the rib portions 28 are integrally connected to an inclined annular wall portion constituted by the first pseudo truncated cone-shaped cylindrical portion 25 and the base end-side portion of the second cylindrical portion 22 constituted by the small-diameter end portion 26b of the second pseudo truncated cone-shaped cylindrical portion 26.

Also, three or more rib portions 28 can be arranged at predetermined angular intervals relative to the semicircular truncated cylinder portion 26A or 26B located on respective end sides in the major axis direction of the seat portion 24, and the rib widths may change according to the inclination angle relative to the major axis direction, or may be different on one end side and the other end side in the extending direction.

Furthermore, the ridgelines on the projecting end sides of the rib portions 28, which extend from the vicinity of the intermediate connection portion 27 of the second cylindrical portion 22 to the connection portion j1 between the first pseudo truncated cone-shaped cylindrical portion 25 and the seat portion 24, may be straight lines or curved lines.

Even in this case, when the group of electrical wires 11 of the wire harness 1 with the grommet 12 attached thereto is strongly pulled in order to fit the grommet 12 to the inner peripheral edge portion Pe of the through-hole H2 of the vehicle body panel P, it is possible to effectively suppress the case where the second pseudo truncated cone-shaped cylindrical portion 26 collapses or undergoes bending deformation on the two end sides in the major axis direction of the seat portion 24, and with respect to the pulling stroke of the group of electrical wires 11 that is necessary to fit the seat portion 24 to the vehicle body panel P, the pulling stroke on the two sides in the major axis direction is suppressed to approximately the same as on the two sides in the minor axis direction of the seat portion 24, and the grommet 12 can be efficiently mounted to the vehicle body panel P.

First Comparative Example

Figure 8:
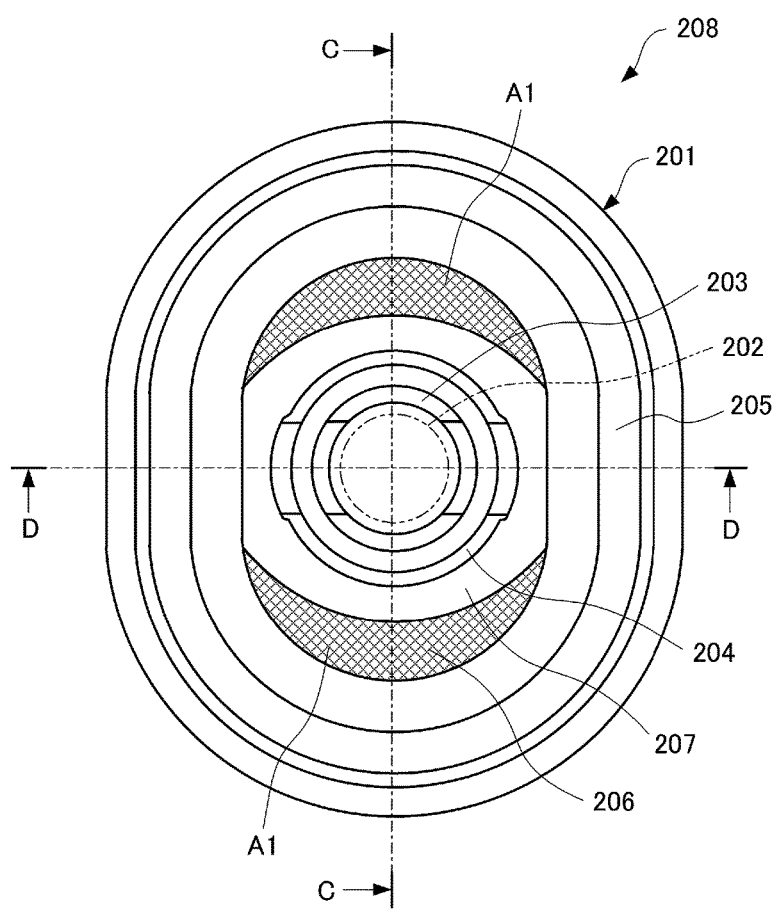
FIG. 8 is an axial direction view of a grommet of a first comparative example that is based on a conventional grommet and modified to be capable of being mounted to an elliptical through-hole.
Figure 10:
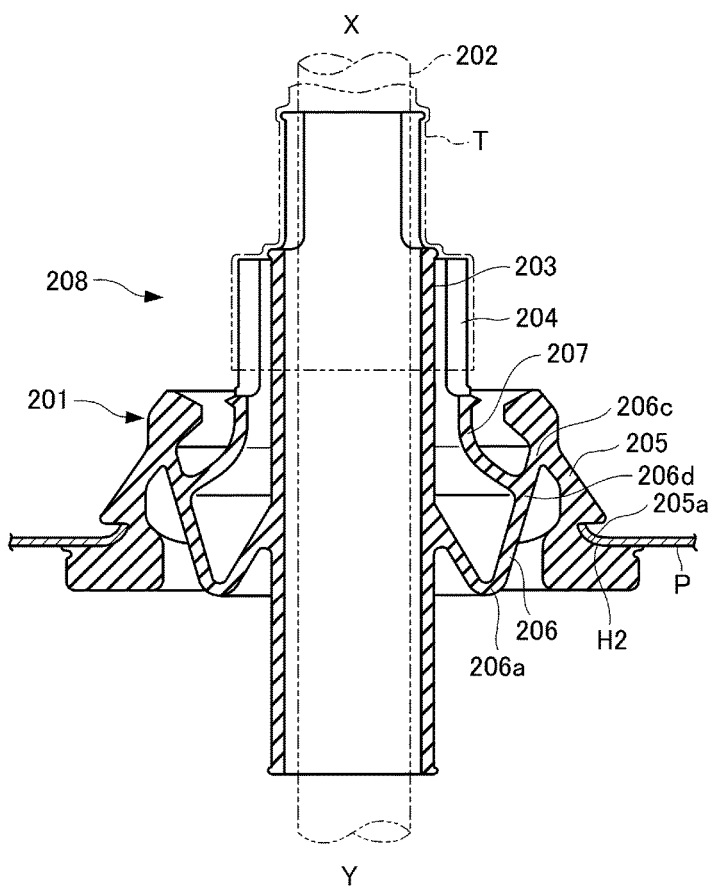
FIG. 10 is a cross-sectional view taken along D-D in FIG. 8.

FIGS. 8 and 10 show a first comparative example that is based on the conventional grommet 101 and modified to be capable of being mounted to the elliptical through-hole H2.

A wire harness 208 of this comparative example is constituted including a grommet 201, which is indicated by solid lines and is closely fitted into the elliptical through-hole H2 formed in the vehicle body panel P that is a partition wall between the engine room X and the compartment Y, and a group of electrical wires 202, which is indicated by dashed double-dotted lines and is inserted through and fixed to the grommet 201. The grommet 201 includes: a first cylindrical portion 203 that has a cylindrical shape; a second cylindrical portion 204 that has a cylindrical shape and coaxially surrounds an axially intermediate portion of the first cylindrical portion 203; a seat portion 205 that coaxially surrounds the first cylindrical portion 203 and the second cylindrical portion 204, is to be mounted to the through-hole H2 of the vehicle body panel P, and has an elliptical shape in plan view; a first wall portion 206 that is integrally continuous with the outer peripheral surface of the axially intermediate portion of the first cylindrical portion 203 and the inner peripheral surface of an axially intermediate portion of the seat portion 205, and has a mountain-shaped bent portion 206a in which the cross-sectional shape along the axis is bent in a mountain shape toward the compartment Y side; and a second wall portion 207 that is integrally continuous with a portion of the first wall portion 206 that is radially outward of the mountain-shaped bent portion 206a, and that is integrally continuous with the end portion on the compartment Y side of the second cylindrical portion 204.

In the grommet 201, the cylindrical first cylindrical portion 203 and second cylindrical portion 204 are integrally connected to the seat portion 205, which has an elliptical shape in plan view, via the first wall portion 206 and the second wall portion 207.

Figure 9:
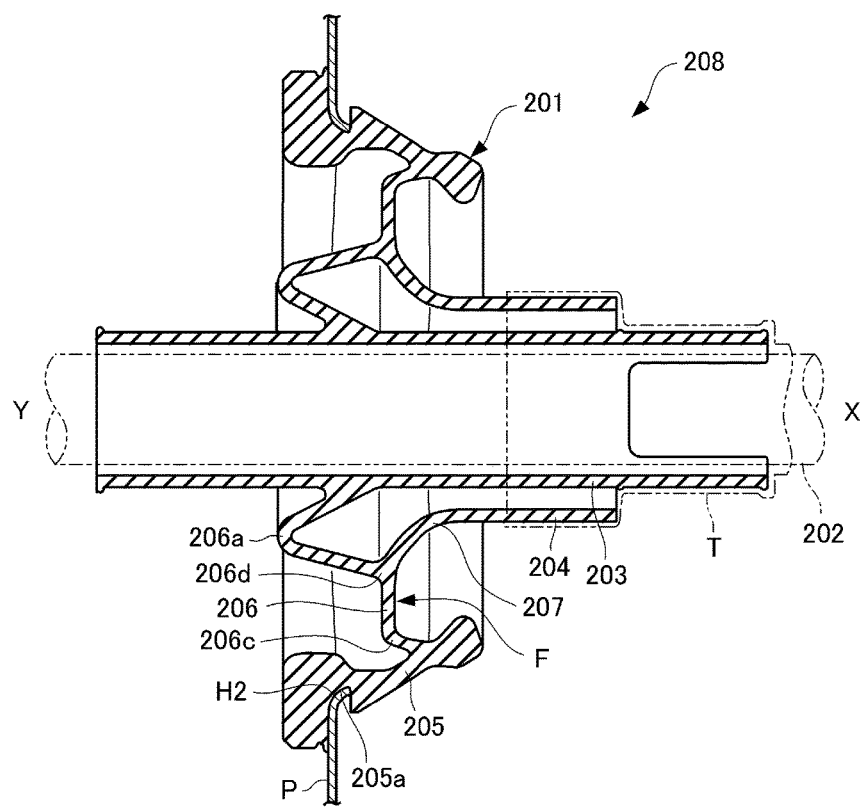
FIG. 9 is a cross-sectional view taken along C-C in FIG. 8.

The second wall portion 207 is shaped as a trumpet that expands by the same percentage in the diameter direction toward the compartment Y side and is centered about the axis of the first cylindrical portion 203. As shown in FIG. 9, the first wall portion 206 is shaped such that portions between an intermediate connection portion 206d, which is between the first wall portion 206 and the second wall portion 207, and an outer peripheral connection portion 206c, which is between the first wall portion 206 and the seat portion 205, are flat surfaces F that are orthogonal to the axis of the first cylindrical portion 203. These flat surfaces F are the areas indicated by hatching A1 in FIG. 8. Specifically, the grommet 201 has the flat surfaces F, which are shown in FIG. 9 and correspond to the area indicated by hatching A1 in FIG. 8, on the two sides in the major axis direction, and has an elliptical shape in plan view, and does not have the flat surfaces F shown in FIG. 9 in the cross-sectional shape in the minor axis direction shown in FIG. 10.

The inner peripheral edge portion of the through-hole H2 of the vehicle body panel P is formed as a short elliptical cylinder-shaped flange that is bent toward the engine room X side. The seat portion 205 has an annular groove portion 205a that has a conical cylindrical surface that corresponds to the flange of the through-hole H2, and the flange of the through-hole H2 of the vehicle body panel P is fitted into the outer peripheral portion.

The portion of the group of electrical wires 202 that projects from the first cylindrical portion 203 toward the engine room X side, and the end portions, on the engine room X side, of the first cylindrical portion 203 and the second cylindrical portion 204 are integrally fixed to each other by the tape-wrap fixing portion T in which adhesive tape is wrapped.

With the wire harness 208, when the grommet 201 is arranged on the compartment Y side of the vehicle body panel such that the second cylindrical portion 204 faces the engine room X side, and then the group of electrical wires 202 is inserted into the through-hole H2 of the vehicle body panel P and pulled to the engine room X side, the first cylindrical portion 203 and the second cylindrical portion 204 pass through the through-hole H2, and the outer peripheral portion of the seat portion 205 is caught on the inner peripheral edge portion of the through-hole H2 of the panel P.

With the wire harness 208, when the group of electrical wires 202 is pulled more strongly to the engine room X side, the seat portion 205 deforms elastically, the flange of the through-hole H2 of the panel P becomes fitted into the annular groove portion 205a of the seat portion 205, and the grommet 201 becomes fixed to the vehicle body panel P.

In the wire harness 208 of the first comparative example configured in this way, when the grommet 201 is mounted to the through-hole H2 of the vehicle body panel P, and then the group of electrical wires 202 is strongly pulled on the engine room X side while the outer peripheral portion of the seat portion 205 is caught on the inner peripheral edge portion of the through-hole H2 of the panel P, the portion that forms the flat surfaces F in the first wall portion 206 elastically deforms so as to stretch at an angle to the axis of the first cylindrical portion 203.

For this reason, with the wire harness 208, there is an increase in the pulling stroke of the group of electrical wires 202 needed in order to fit the inner peripheral edge portion of the through-hole H2 of the vehicle body panel P into the annular groove portion 205a of the seat portion 205, and the grommet 201 cannot be efficiently mounted to the vehicle body panel P.

Second Comparative Example

Figure 11:
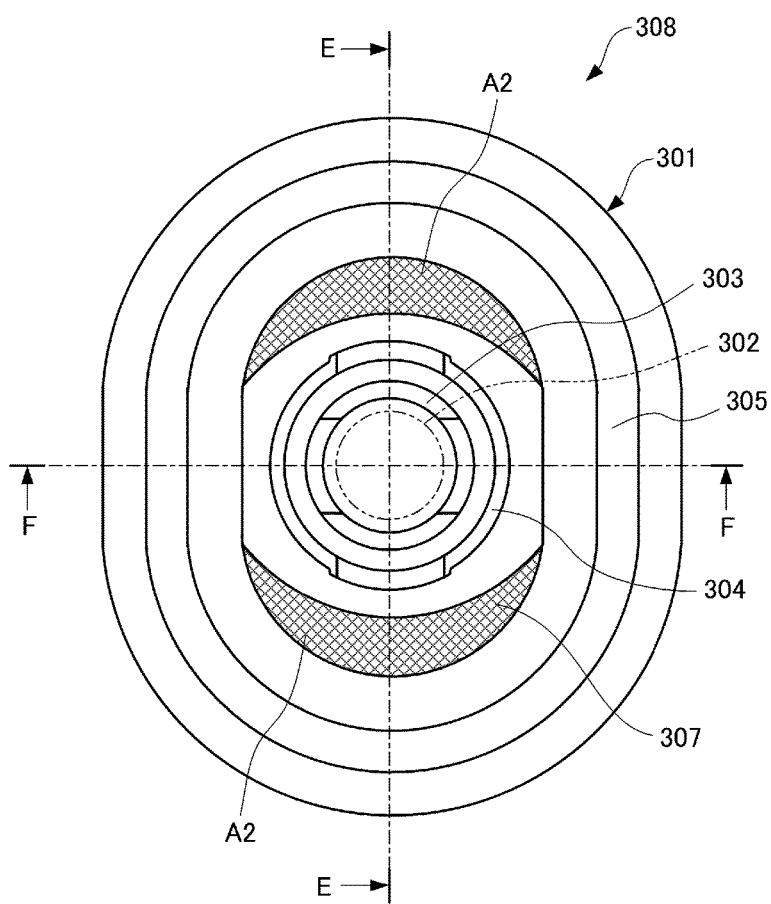
FIG. 11 is an axial direction view of a grommet of a second comparative example that is based on a conventional grommet and modified to be capable of being mounted to an elliptical through-hole.
Figure 12:
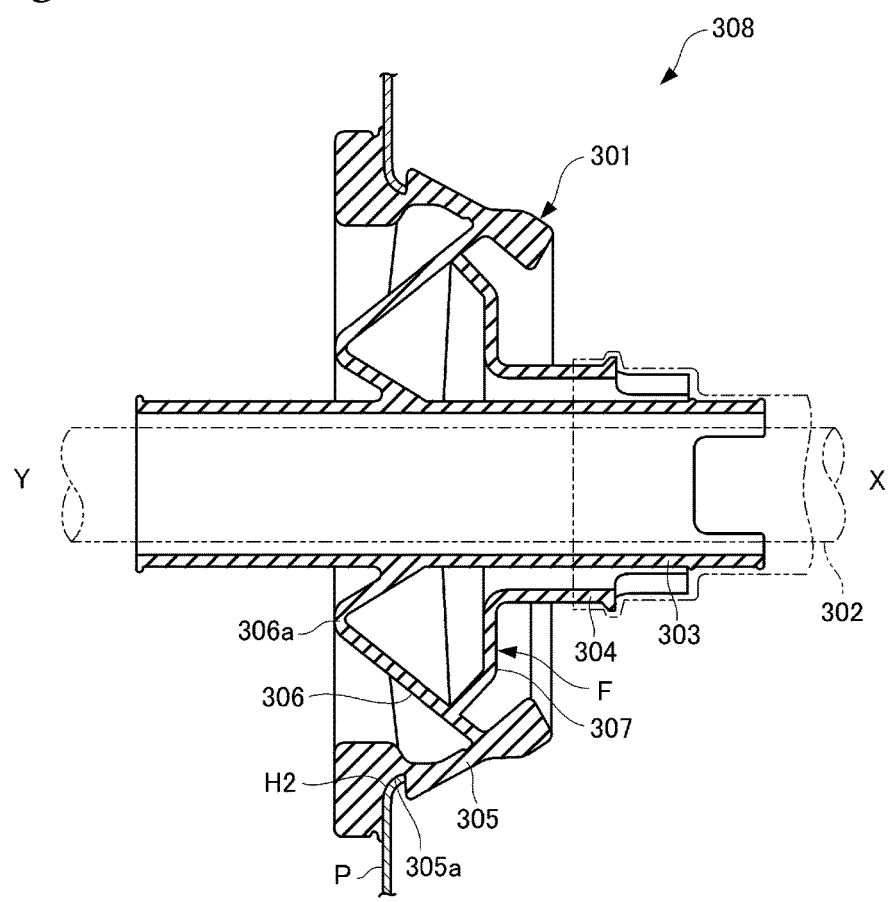
FIG. 12 is a cross-sectional view taken along E-E in FIG. 11.
Figure 13:
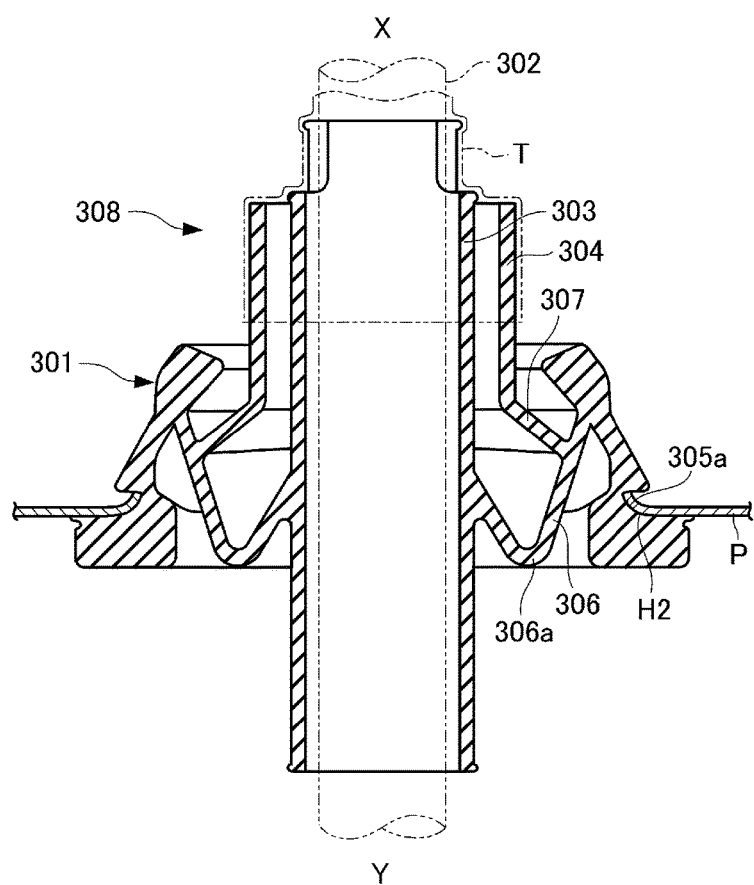
FIG. 13 is a cross-sectional view taken along F-F in FIG. 11.
Figure 14:
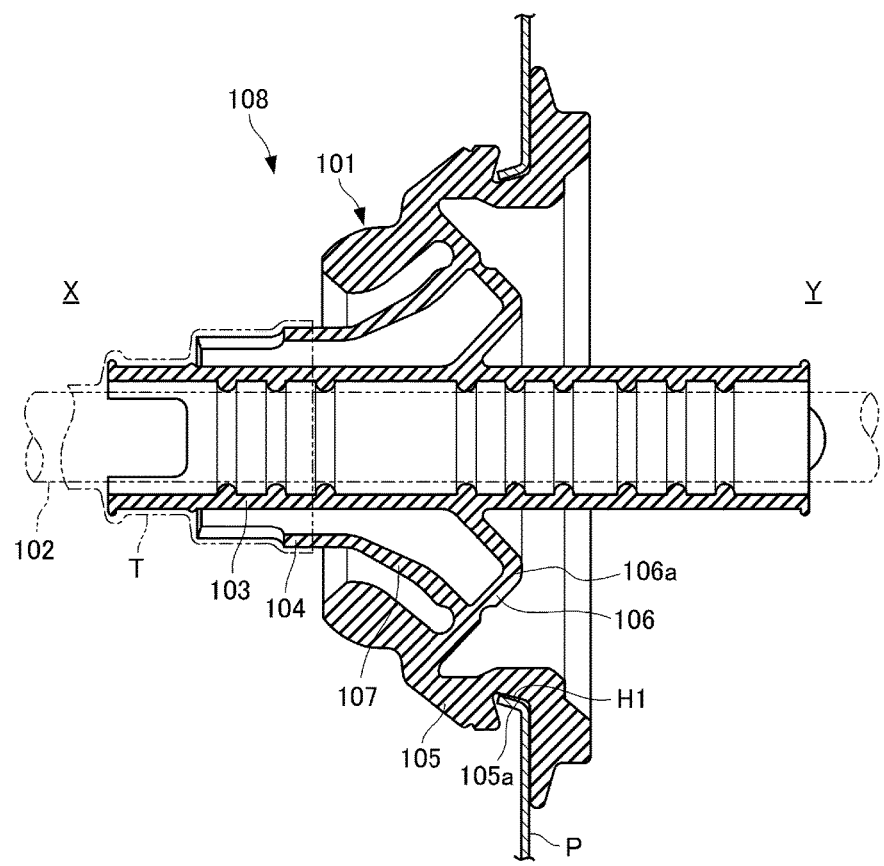
FIG. 14 is a transverse sectional view of a grommet of a conventional example.

The following is a second comparative example in which a grommet 301 shown in FIGS. 11 to 13 is based on the grommet 101 described above and is for mounting to an the elliptical through-hole H2.

The grommet 301 includes: a first cylindrical portion 303 through which a group of electrical wires 302 closely passes for routing between the engine room X and the compartment Y; a second cylindrical portion 304 that coaxially surrounds an axially intermediate portion of the first cylindrical portion 303; a seat portion 305 that coaxially surrounds the first cylindrical portion 303 and the second cylindrical portion 304 and is to be mounted to the through-hole H2 of the vehicle body panel P; a first wall portion 306 that extends in the circumferential direction, is integrally continuous with the outer peripheral surface of the axially intermediate portion of the first cylindrical portion 303 and the inner peripheral surface of an axially intermediate portion of the seat portion 305, and has a cross-sectional shape that is bent in a mountain shape toward the compartment Y side; and a second wall portion 307 that extends in the circumferential direction and is integrally continuous with an end portion on the compartment Y side of the second cylindrical portion 304 and a portion of the first wall portion 306 that is radially outward of a mountain-shaped bent portion 306a. A wire harness 308 is constituted by the grommet 301 and the group of electrical wires 302.

Accordingly, in the grommet 301, the cylindrical first cylindrical portion 303 and second cylindrical portion 304 are integrally connected to the seat portion 305, which has an elliptical shape in plan view, via the first wall portion 306 and the second wall portion 307.

As shown in FIG. 12, the second wall portion 307 is formed such that in the elliptical longitudinal cross-section, the portion on the second cylindrical portion 304 side forms the flat surfaces F that are orthogonal to the axis of the first cylindrical portion 303, and the portion on the first wall portion 306 side is shaped as a trumpet that expands toward the compartment Y side. These flat surfaces F are the areas indicated by hatching A2 in FIG. 11. Specifically, the grommet 301 has the flat surfaces F, which are shown in FIG. 12 and correspond to the area indicated by hatching A2 in FIG. 11, on the two sides in the major axis direction, and has an elliptical shape in plan view, and does not have the flat surfaces F shown in FIG. 11 in the cross-sectional shape in the minor axis direction shown in FIG. 13.

The first cylindrical portion 303 and the second cylindrical portion 304 are cylindrical. The seat portion 305 has an elliptical shape in plan view, and the outer peripheral portion is provided with an annular groove portion 305a for the fitting of the inner peripheral edge portion of the elliptical through-hole H2 formed in the vehicle body panel P.

The portion of the group of electrical wires 302 that projects from the first cylindrical portion 303 toward the engine room X side, and the end portions on the engine room X side of the first cylindrical portion 303 and the second cylindrical portion 304 are integrally fixed to each other by the tape-wrap fixing portion T in which adhesive tape is wrapped.

In the wire harness 308 of the second comparative example configured in this way, when the grommet 301 is arranged on the compartment Y side of the vehicle body panel such that the second cylindrical portion 304 faces the engine room X side, and then the group of electrical wires 302 is inserted into the through-hole H2 of the vehicle body panel P and pulled to the engine room X side, the first cylindrical portion 303 and the second cylindrical portion 304 pass through the through-hole H2, and the outer peripheral portion of the seat portion 305 is caught on the inner peripheral edge portion of the through-hole H2 of the panel P.

With the wire harness 308, when the group of electrical wires 302 is then pulled more strongly to the engine room X side, the seat portion 305 deforms elastically, the inner peripheral edge portion of the through-hole H2 of the panel P becomes fitted into the annular groove portion 305a of the seat portion 305, and the grommet 301 becomes fixed to the vehicle body panel P.

However, with this wire harness 308, when the grommet 301 is mounted to the through-hole H2 of the vehicle body panel P, and then the group of electrical wires 302 is strongly pulled on the engine room X side while the outer peripheral portion of the seat portion 305 is caught on the inner peripheral edge portion of the through-hole H2, the portion that forms the flat surfaces F in the second wall portion 307 elastically deforms so as to stretch at an angle to the axis of the first cylindrical portion 303.

For this reason, with the wire harness 308, there is an increase in the pulling stroke of the group of electrical wires 302 needed in order to fit the inner peripheral edge portion of the through-hole H2 of the vehicle body panel P into the annular groove portion 305a of the seat portion 305, and the grommet 301 cannot be efficiently mounted to the vehicle body panel P.

As described above, it is understood that the problems in terms of the mounting operation and the mounting efficiency in the first and second comparative examples are solved in the first embodiment and the other embodiment of the present invention.

As described above, the present invention has an effect of making it possible to efficiently mount a grommet to an elliptical through-hole formed in a vehicle body panel, and is broadly useful to grommets and wire harnesses that have a grommet for mounting to an elliptical through-hole in a vehicle panel.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Wire harness
11 Group of electrical wires
12 Grommet
13 Tape-wrap fixing portion (annular fixing member)
21 First cylindrical portion
22 Second cylindrical portion
22a Compartment-side end portion
23 Truncated cone-shaped cylindrical portion (connection portion, inner truncated cone surface-shaped wall portion, compartment-side annular connection portion)
23a Small-diameter end portion
23b Large-diameter end portion
24 Seat portion (rubber elastic body)
24a Step portion (annular unevenness portion)
24b Annular groove portion (annular unevenness portion)
24c Intermediate outer diameter portion 24c (annular unevenness portion)
25 First pseudo truncated cone-shaped cylindrical portion (connection portion, inclined annular wall portion, compartment-side annular connection portion)
25a Small-diameter end portion
25b Large-diameter end portion
25f Annular inclined surface
25A, 25B First semicircular truncated cylinder portion (portions on two sides in major axis direction)
25C First inclined surface portion
26 Second pseudo truncated cone-shaped cylindrical portion (engine room-side annular connection portion)
26a Large-diameter end portion (outer truncated cone surface-shaped wall portion)
26b Small-diameter end portion (base end-side portion of second cylindrical portion)
26A, 26B Second semicircular truncated cylinder portion (portions on two sides in major axis direction)
26C Second inclined surface portion
27 Intermediate connection portion (axially intermediate portion)
H2 Through-hole (opening)
P Vehicle body panel
Pe Inner peripheral edge portion (opening edge portion, opening portion)
X Engine room
Y Compartment

The invention claimed is:

1. A grommet that is to be attached to a group of electrical wires and mounted to a vehicle body panel so as to block an opening in the vehicle body panel, the grommet comprising:
 a first cylindrical portion through which the group of electrical wires is inserted;
 a second cylindrical portion that is formed shorter in an axial direction than the first cylindrical portion and surrounds the first cylindrical portion;
 a seat portion that is constituted by an annular rubber elastic body that surrounds the second cylindrical portion and is capable of constriction in diameter, the seat portion having an annular unevenness portion capable of fitting around an edge portion of the opening in the vehicle body panel; and
 an annular connection portion that elastically connects the first cylindrical portion and the seat portion,
 wherein the seat portion has an approximately elliptical shape,
 the connection portion has an inclined annular wall portion that forms an inclined annular surface that is inclined in the axial direction between the first cylindrical portion and the seat portion, the inclined annular wall portion supporting a base end portion of the second cylindrical portion, and
 a plurality of rib portions are integrally provided on the inclined annular wall portion and the second cylindrical portion, the plurality of rib portions extending from an axially intermediate portion of the second cylindrical portion to the inclined annular wall portion on two sides in a major axis direction of the approximately elliptical shape, and projecting from the second cylindrical portion to a seat portion side.

2. The grommet according to claim 1, wherein the connection portion has an inner truncated cone surface-shaped wall portion between the inclined annular wall portion and the first cylindrical portion, the inner truncated cone surface-shaped wall portion being inclined in a direction opposite in the axial direction to the annular inclined surface of the inclined annular wall portion.

3. The grommet according to claim 1, wherein an outer truncated cone surface-shaped wall portion is integrally provided between the base end portion of the second cylindrical portion and the inclined annular wall portion of the connection portion, the outer truncated cone surface-shaped wall portion being inclined in a direction opposite in the axial direction to the annular inclined surface of the inclined annular wall portion.

4. The grommet according to claim 1,
 wherein the plurality of rib portions extend from an axially intermediate portion of the second cylindrical portion to a connection portion between the inclined annular wall portion and the seat portion, and
 a height of projection of the rib portions from the second cylindrical portion is smaller on one end side located on an axially intermediate portion side of the second cylindrical portion, and is larger on another end side that is connected to the inclined annular wall portion.

5. A wire harness comprising:
 the grommet according to claim 1;

the group of electrical wires inserted into the first cylindrical portion of the grommet; and an annular fixing member that fixes a leading end portion of the second cylindrical portion of the grommet, which is located on one end side of the first cylindrical portion, around the first cylindrical portion, and fixes a portion on the one end side of the first cylindrical portion to the group of electrical wires.

6. A grommet that has a first cylindrical portion into which a group of electrical wires is to be inserted, and that is to be mounted to an elliptical through-hole formed in a vehicle body panel that is a partition wall between an engine room and a compartment, the grommet comprising:

a second cylindrical portion that is shaped as a cylinder that has a predetermined diameter larger than the first cylindrical portion and a predetermined length shorter in an axial direction than the first cylindrical portion, and is located at a position coaxially surrounding an axially intermediate portion of the first cylindrical portion;

a seat portion that is shaped as an elliptical cylinder having a predetermined inner diameter larger than the second cylindrical portion, is located at a position coaxially surrounding the first cylindrical portion and being biased on a compartment side relative to the second cylindrical portion, and is to be mounted to the through-hole of the vehicle body panel at a step portion formed on the compartment side;

a compartment-side annular connection portion having a large-diameter end portion that is integrally continuous with an inner peripheral surface of the seat portion and a small-diameter end portion that is integrally continuous with an outer peripheral surface of the first cylindrical portion; and an engine room-side annular connection portion having a large-diameter end portion that is integrally continuous with an intermediate portion of the compartment-side annular connection portion, the intermediate portion being biased toward the large-diameter end portion of the compartment-side annular connection portion, and a small-diameter end portion that is integrally continuous with a compartment-side end portion of the second cylindrical portion, wherein the seat portion has an elliptical shape in plan view, and an outer peripheral portion is provided with an annular groove portion into which an opening edge portion of the through-hole is to be fitted, and the engine room-side annular connection portion has a plurality of rib portions on an engine room side, the plurality of rib portions extending in a manner of radiating in a longitudinal direction of the seat portion from the small-diameter end portion to the large-diameter end portion, and the plurality of rib portions being integrally continuous with an inner peripheral surface of the seat portion.

7. The grommet according to claim 6, wherein the compartment-side annular connection portion has a truncated cone-shaped cylindrical portion that is positioned in correspondence with the step portion of the seat portion, and has a small-diameter end portion that is integrally continuous with an outer peripheral surface of an axially intermediate portion of the first cylindrical portion and a large-diameter end portion that extends toward the compartment, and a first pseudo truncated cone-shaped cylindrical portion that is located between the truncated cone-shaped cylindrical portion and the seat portion, and has a small-diameter end portion that is integrally continuous with the large-diameter end portion of the truncated cone-shaped cylindrical portion and a large-diameter end portion that is integrally continuous with an intermediate portion of an inner peripheral surface of the seat portion, and the engine room-side annular connection portion has a second pseudo truncated cone-shaped cylindrical portion that is located between the first pseudo truncated cone-shaped cylindrical portion and the second cylindrical portion and has a large-diameter end portion that is integrally continuous with an intermediate portion of the first pseudo truncated cone-shaped cylindrical portion, the intermediate portion being biased toward the large-diameter end portion of the first pseudo truncated cone-shaped cylindrical portion, and a small-diameter end portion that is integrally continuous with a compartment-side end portion of the second cylindrical portion.

8. The grommet according to claim 7, wherein the first pseudo truncated cone-shaped cylindrical portion has an integral shape in which a pair of first semicircular truncated cylinder portion are in portions on two sides, and a pair of first inclined surface portions are integrally continuous with and located between the pair of first semicircular truncated cylinder portions, and the second pseudo truncated cone-shaped cylindrical portion has an integral shape in which a pair of second semicircular truncated cylinder portion are in portions on two sides, and a pair of second inclined surface portions are integrally continuous with and located between the pair of second semicircular truncated cylinder portions.

9. The grommet according to claim 7, wherein a connection portion between the second cylindrical portion and the second pseudo truncated cone-shaped cylindrical portion is located at a position inward of and corresponding to an end portion on the engine room side of the seat portion.

* * * * *